June 16, 1942.  J. L. ANDERSON  2,286,664
CIRCLE CUTTING ATTACHMENT
Filed Sept. 17, 1940   2 Sheets-Sheet 2
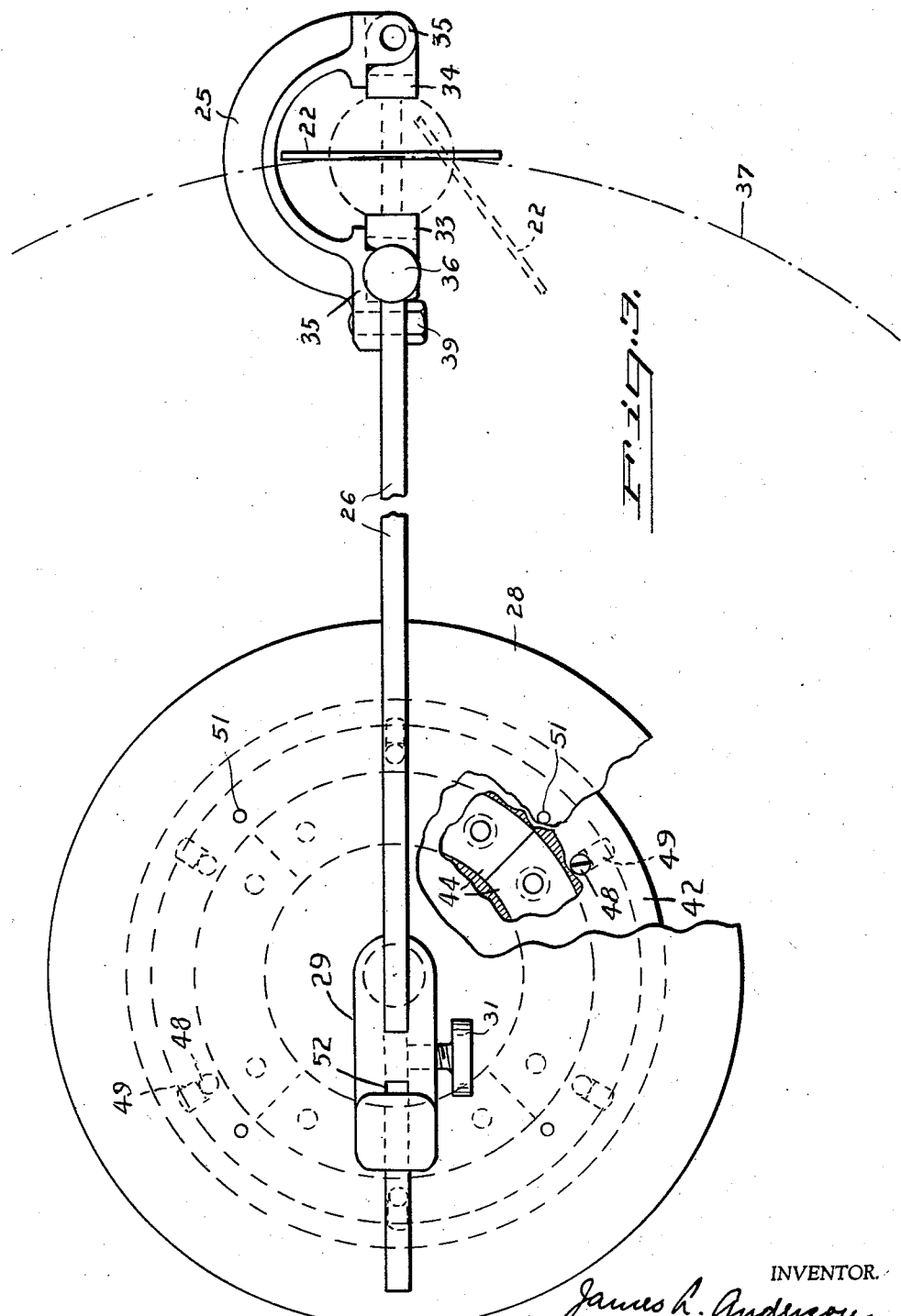
INVENTOR.
James L. Anderson
BY J. F. Brandenburg
ATTORNEY.

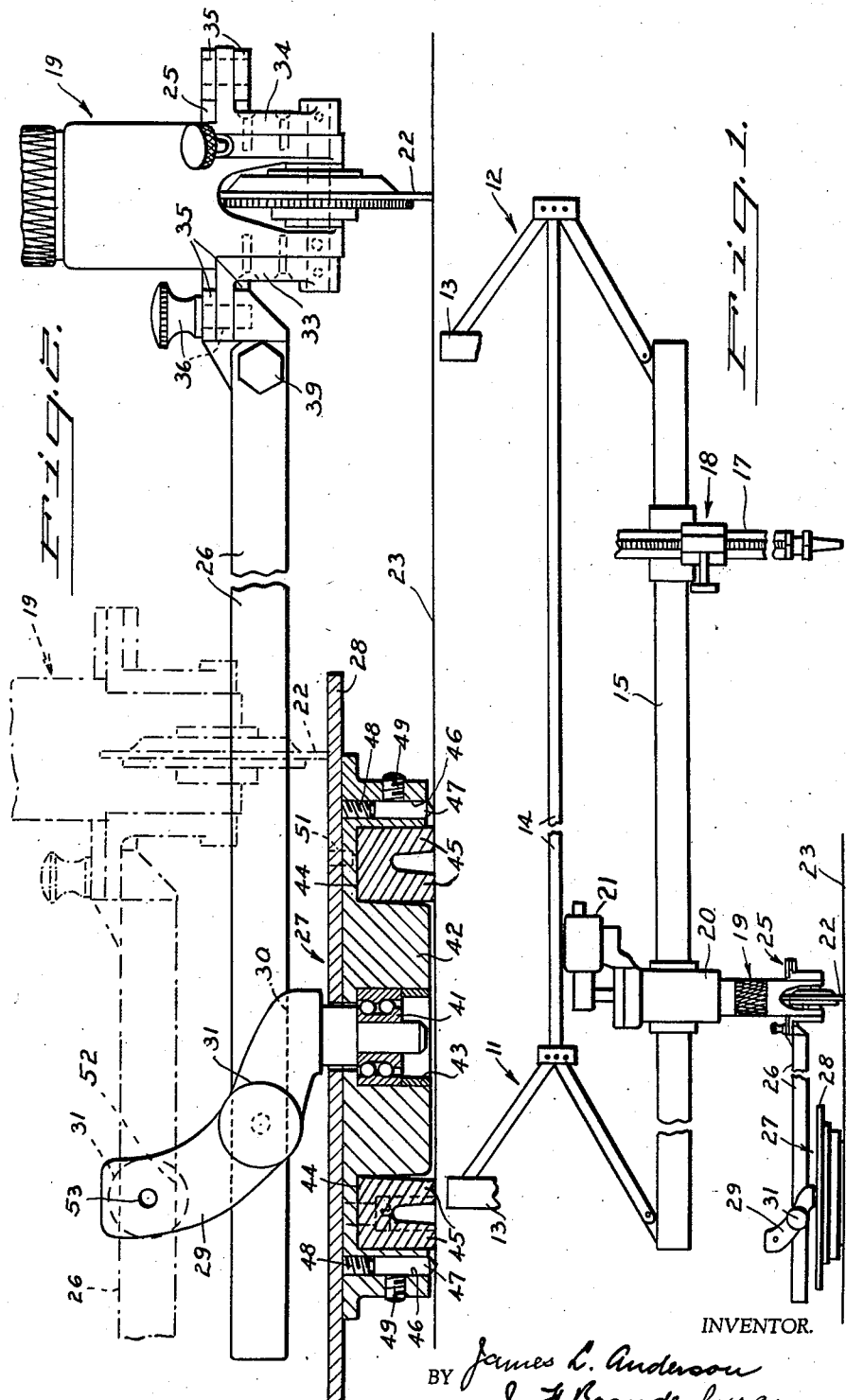

Patented June 16, 1942

2,286,664

UNITED STATES PATENT OFFICE 2,286,664

CIRCLE CUTTING ATTACHMENT

James L. Anderson, Closter, N. J., assignor to Air Reduction Company, Incorporated, New York, N. Y., a corporation of New York Application September 17, 1940, Serial No. 357,112

10 Claims. (Cl. 33—27)

The invention relates to apparatus for cutting circles with a gas cutting torch.

In universal torch machines a tracer is connected with the torch-holder in such a way that movement of the tracer along a given path causes the torch to move along a similar path. It is an object of this invention to provide improved apparatus for causing the tracer of such a cutting machine to follow a circular course.

The invention is not limited to the guiding of tracers, however, but can be connected directly to a torch or torch-holder, and may even be used to guide a self-propelled torch carriage around a circular path. In its broadest aspects, therefore, it may be said to be an object of the invention to provide improved apparatus for cutting circles with a gas torch.

The invention includes a magnetic center device which can be positioned quickly and conveniently, and includes simple and effective connecting means for causing a tracer, or other device, to travel around the magnetic center device at any chosen radius over a wide range. One feature of the invention relates to a connection between a tracer and the guiding means for starting a cut either inside or outside of the desired circular path so as to avoid an imperfect edge on the finished piece.

Other objects, features and advantages of the invention will appear or be pointed out as the specification proceeds.

In the accompanying drawings, forming a part hereof:

Fig. 1 is a diagrammatic view of a universal torch machine with the circle cutting attachment of this invention connected with the tracer;

Fig. 2 is an enlarged view of the circle cutting attachment and a portion of the tracer of Fig. 1, with the magnetic center device shown in section; and Fig. 3 is a top plan view, partly broken away, of the structure shown in Fig. 2, but without the tracer.

The universal torch machine of Fig. 1 includes two jointed arms 11 and 12 that swing on spaced columns 13, and are connected by a link 14 and a front bar 15. The forward sections of the jointed arms 11 and 12 form with the link 14 and front bar 15 a folding parallelogram frame. Since the front bar 15 always moves parallel to itself, all parts of the bar move along similar paths.

A cutting torch 17 is held by a torch-holder 18 secured to the front bar 15. A tracer 19 is connected with the front bar 15 by a bracket 20. The tracer has a motor 21 that drives a traction wheel 22, and the wheel runs on a pattern table 23 which is constructed of magnetic material such as iron or steel. The tracer is rotatable in the bracket 20 about a vertical axis that runs through the point of contact of the wheel 22 on the pattern table.

The tracer 19 has a sliding vertical or floating movement in the bracket 20, but transverse movement of the tracer in any direction causes an equal movement of the bracket 20, front bar 15, and torch 17 in the same direction. No further description of the tracer is necessary for a full understanding of this invention. The construction of such tracers is well known in the art.

The stem portion at the lower end of the tracer 19 fits into a semicircular end bracket 25 that is rigidly connected with one end of a radius bar 26. A magnetic center device 27 is attracted to the pattern table 23. The top of the center device 27 is covered by a plate 28. The radius bar 26 extends through an opening 30 in a center post 29 and is clamped against movement relative to the post 29 by a set-screw 31. The bar 26 slides lengthwise through the opening in the post 29 and can be clamped in different positions by the set-screw 31 to change the radius of the circle described by the tracer.

Figs. 2 and 3 show the construction of the circle cutting attachment. There are angles 33 and 34 attached to opposite sides of the tracer 19, and these angles extend between bifurcations 35 at opposite ends of the bracket 25. A pin 36 extends through the left-hand bifurcated end of the bracket 25 and provides a pivot connection between the angle 33 and the left end of the bracket 25.

The tracer 19 can swing about this pivot connection to bring the wheel 22 into the dotted-line position shown in Fig. 3. In this position the point of traction of the wheel 22 is inside the circle 37 that the wheel describes when the tracer is in its working position with respect to the bracket 25 (full-line position in Fig. 3). The wheel 22 is driven by the tracer motor in the direction which causes it to move toward the bracket 25, that is, with the wheel 22 in the dotted position shown in Fig. 3, its rotation causes it to move into the position shown in full lines. By the time the wheel 19 reaches this position the angular connector 34 of the tracer has moved into the right-hand bifurcated end of the bracket which serves as an abutment to prevent any further movement of the tracer relative to the bracket 25 or radius bar 26, and the tracer, bracket, and radius bar move as a unit around the axis of rotation of the center post.

When the tracer is swung about the pivot 36 and the wheel 22 is in the position shown in full lines (Fig. 3), the torch that the tracer controls is, of course, also inside the circle that corresponds to circle 37 described by the tracer. This is advantageous when starting a cut because there is a rough portion at the start wider than the rest of the kerf and by starting the cut at a point inside the circle there is no imperfection along the finished edge of the work-piece after cutting.

When the disk cut out of the work-piece is the part to be used, the cut is started outside of the circle by moving the pivot pin 36 from the left end of the bracket 25 and inserting it through the bifurcations in the right end of bracket 25 and through the right angle 34. The tracer will then swing outside of the circle 37 instead of inside.

The radius bar 26 has a flat end that contacts with a flat surface of the bracket 25, and the bracket is rigidly connected to the radius bar by a screw 39.

The lower end of the center post 29 fits into a ball bearing 41 (Fig. 2) in a housing 42. The ball bearing is held in the housing by a bushing 43, but the center post 29 can be lifted out of the ball bearing.

An annular magnet 44 is held within a recess in the housing 42 and has pole faces 45 extending below the bottom of the housing 42. The annular magnet is of composite construction and is made up of four permanent magnets of arcuate shape. Separate magnets that do not touch one another can be used in place of the continuous annular magnet, but at some sacrifice in the holding power of the device.

There are vertical openings 46 at angularly spaced regions around the housing 42. In each of these openings 46 there is a support or leg 47 with a pointed lower end extending below the bottom of the housing. The distance to which the leg 47 extends below the housing 42 is determined initially by a screw 48 threaded into the upper end of the opening 46, and the leg is held against downward displacement by a set-screw 49.

The positions of the legs 47 are preferably adjusted so as to locate the points at the ends of the legs in a plane that is a few-thousandths of an inch below the level of the pole faces 45 of the annular magnet 44. With such a relation between the pointed supports 47 and the pole faces of the magnet, the points of the legs or supports 47 are depressed into the surface of the pattern table 23 by the combined weight and magnetic attraction of the center device, and prevent the device from sliding on the pattern table. With the points thus depressed into the table surface, the pole faces 45 touch or substantially touch the surface of the pattern table 23.

The plate 28 is held in place by dowel pins 51 that are pressed into the housing 42 and fit snugly through holes in the plate 28. These dowel pins prevent the plate 28 from sliding transversely on the housing 42, but permit the plate 28 to be lifted from the housing.

When the invention is used for cutting circles only slightly larger than the diameter of the housing 42, the plate 28 is removed. With the tracer wheel 22 running on the table 23, the smallest circle that can be cut is limited by the fact that the right connector angle 33 strikes the side of the housing 42 when the radius is reduced below a certain limit.

For cutting smaller circles, the plate 28 is placed on top of the housing 42 and the radius bar 26 is inserted through a higher opening 52 in the center post 29. The set screw 31 is screwed into a threaded opening 53 to clamp the radius bar when the bar is in the upper opening 52. With the radius bar in the upper opening 52, the wheel 22 runs on the plate 28, as shown in dotted lines in Fig. 2, and the radius bar 26 can be adjusted for circles of small diameter.

The plate 28 extends beyond the housing sufficiently to make the largest circle that can be cut with the tracer running on the plate 28 at least as large as the smallest circle that can be cut with the tracer wheel running on the table 23.

The offset of the upper portion of the center post 29 permits the tracer to move in closer to the axis of rotation and makes the invention capable of cutting circles of smaller diameter than if the center post were straight.

The preferred embodiment of the invention has been described, but changes and modifications can be made, and some features of the invention can be used without others.

I claim:

1. A circle cutting attachment including a center assembly with a magnet for holding said assembly fixed at any selected location on a pattern table, a center post in said assembly, a radius bar for connecting a tracer or other part to be guided with the center post, connecting means on the outer end of the bar shiftable with respect to the radius bar to cause the cutting operation to be started either inside or outside of the circumference of the circle to be cut, an abutment with which the connecting means contacts, and other means for controlling the radius of the circle cut by said attachment.

2. In circle cutting apparatus, a fixed center device, a radius bar connected with the fixed center device, and a connection at the outer end of the bar for securing the bar to a tracer, said connection including a part that fastens to the tracer and is movable with a radial component to shift the tracer to one side of the circumference of the circle intended to be described by the tracer, and an abutment for positioning the said part in a definite relation to the radius bar when moved into position to locate the tracer on the circumference of said circle.

3. A circle cutting attachment including a magnet for holding the attachment in place, a center post connected with the magnet, a radius bar connecting the center post with a tracer and movable lengthwise with respect to at least one of these connected elements to change the radius of the circle to be cut, and an annular bearing surface on top of the magnet and surrounding the center post, said annular bearing surface providing a supporting surface on which the tracer runs when cutting circles of small diameter.

4. In a circle cutting attachment for a torch cutting machine, a magnet for holding said attachment in position on a pattern table, a rotatable center post connected with the magnet, the upper portion of said post being offset from the axis of rotation of the post, a radius bar for connecting a tracer with the center post to guide the tracer in a circular path, an annular plate covering the magnet and coaxial with the axis of rotation of the center post, means for connecting the radius bar with the upper offset portion of the center post when the tracer is to run on the annular plate to describe a small circle, and means for connecting the radius bar with the center post below the offset portion when the tracer is to run on the pattern table to describe a larger circle.

5. A circle cutting attachment including in combination a housing, an annular magnet in the housing with pole faces projecting from the bottom of the housing, a plurality of legs extending from the bottom of the housing and having pointed ends terminating in a plane that is only slightly below the pole faces, so that with the pointed ends of said legs pressed into the surface of a table or other surface by which the attachment is supported, the pole faces contact with said table or surface, means for adjusting the legs to increase or decrease their extent below the housing and pole faces, a bearing in the housing, and a center post extending from the top of the housing and rotatable in said bearing.

6. A circle cutting device for guiding a tracer including in combination a center structure with pointed supports for contact with a metal pattern table, a magnet for increasing the pressure of the pointed supports against the table, a radius bar for connection with the tracer, and a connection between the radius bar and the center structure.

7. In a circle cutting attachment, a center device with means for holding it in a fixed position on a supporting table, a center post on said device; a radius bar connected with the center post, a bracket at the outer end of the radius bar, and connecting means for attaching a tracer to the bracket including pivot bearings on which the tracer can swing with respect to the bracket to shift the tracer either inside or outside of the circumference of the circle to be described.

8. A center device for a circle cutting attachment comprising a generally circular housing, an annular magnet made up of a number of arcuate magnets connected to the housing by screws threaded into the upper wall of the housing, annular pole faces at the bottom of said annular magnet and a short distance below the bottom of the housing, a number of openings through the housing at angularly spaced points around the housing outside of the annular magnet, a set-screw threaded into the top of each opening, a leg in said opening with a pointed lower end below the bottom of the housing, another set-screw threaded through the housing and into contact with the leg to hold it in said opening, a circular flat plate over said housing and extending some distance beyond the sides of the housing, a ball bearing in the center of the housing, and a center post rotatable in the ball bearing and extending upward from the housing with an upper portion in which are horizontal openings for a radius bar, said openings being spaced vertically by a distance substantially equal to the height of the top surface of the plate above a plane that contacts with the pointed ends of the legs.

9. In a circle cutting attachment, a center device with means for holding it in a set position on a support, a center post on said device, a radius bar connected with the center post, a semicircular bracket connected to the outer end of the radius bar and large enough to extend at least half-way around a stem portion of a tracer, bifurcations at both ends of the semicircular bracket with openings for receiving a pivot, angular connectors on opposite sides of the tracer, in position to extend between the bifurcations at the opposite ends of the bracket at the same time, a pivot pin that extends through either of the bifurcated ends and its associated angular connector, and a knob at the top of said pin for shifting it from one end of the bracket to the other.

10. Apparatus for guiding the tracer of a cutting machine to describe circles of different diameter, said apparatus including a radius bar that is connected with the tracer, a center post connected with the radius bar, a circular frame in which the center post is held, a magnet in said frame for holding the frame in position on a pattern table, a circular plate on top of the frame and extending beyond the frame to provide a supporting surface for the tracer above the frame when the tracer is describing circles of small diameter, and readily-detachable means holding the circular plate in position on the frame.

JAMES L. ANDERSON.